(12) United States Patent
Ehrmanntraut

(10) Patent No.: US 6,863,949 B2
(45) Date of Patent: Mar. 8, 2005

(54) FOIL-ENVELOPED EVACUATED THERMAL INSULATION ELEMENTS

(75) Inventor: Michael E. Ehrmanntraut, Würzburg (DE)

(73) Assignee: Va-Q-tec AG, Würzburg (DE)

(*) Notice: Subject to any disclaimer, the term of this patent is extended or adjusted under 35 U.S.C. 154(b) by 0 days.

(21) Appl. No.: 09/920,462

(22) Filed: Aug. 1, 2001

(65) Prior Publication Data

US 2002/0018872 A1 Feb. 14, 2002

(30) Foreign Application Priority Data

Aug. 3, 2000 (DE) .......................................... 100 38 584
Nov. 24, 2000 (DE) .......................................... 100 58 566

(51) Int. Cl.⁷ .................................................. B32B 1/04
(52) U.S. Cl. ............................ 428/69; 428/71; 428/75; 428/76; 428/68; 428/69; 428/57; 428/121; 428/126; 428/129; 428/130; 428/192; 493/101; 493/903; 493/907; 493/908; 53/403; 53/405; 53/432; 52/309.9; 52/404.1; 52/406.1; 52/406.2
(58) Field of Search .......................... 428/75, 76, 71, 428/121, 68, 126, 129, 69, 130, 57, 192; 493/101, 903, 907, 908; 53/403, 405, 432; 52/404.1, 406.1, 406.2, 309.9

(56) References Cited

U.S. PATENT DOCUMENTS 4,749,600 A * 6/1988 Cullen et al. ............... 428/34.3
5,900,299 A * 5/1999 Wynne ........................ 428/69

* cited by examiner

Primary Examiner—Nasser Ahmad
Assistant Examiner—Jane Rhee
(74) Attorney, Agent, or Firm—Frank H. Foster; Kremblas, Foster, Phillips & Pollick

(57) ABSTRACT

The invention relates, on the one hand, to a prismatic, especially panel-formed thermal insulation element which is enveloped in a gas-tight foil and evacuated, whereby a stable core pre-formed from a porous material is completely enveloped in a single cut sheet of the gas-tight foil; as well as a manufacturing process for same comprising the following steps:

a) Manufacture of a prismatic core corresponding to the desired form of the thermal insulation element from a porous material;
b) Enveloping of the principal faces of this core with a single sheet of the gas-tight foil;
c) At least partial welding together of the foil which is drawn tight around the core along the face of the core;
d) Folding-in of the welded seam area of the foil against the face of the core;
e) Stress-free folding-together of the areas of the cut sheet of gas-tight foil projecting beyond the core, covering and in flat contact with the end surface(s) of the core;
f) Welding together of the folded-together areas of foil on at least one end face of the core;
g) Evacuation of the enveloped core;
h) Complete welding closed of all remaining openings in the foil under vacuum.

8 Claims, 3 Drawing Sheets

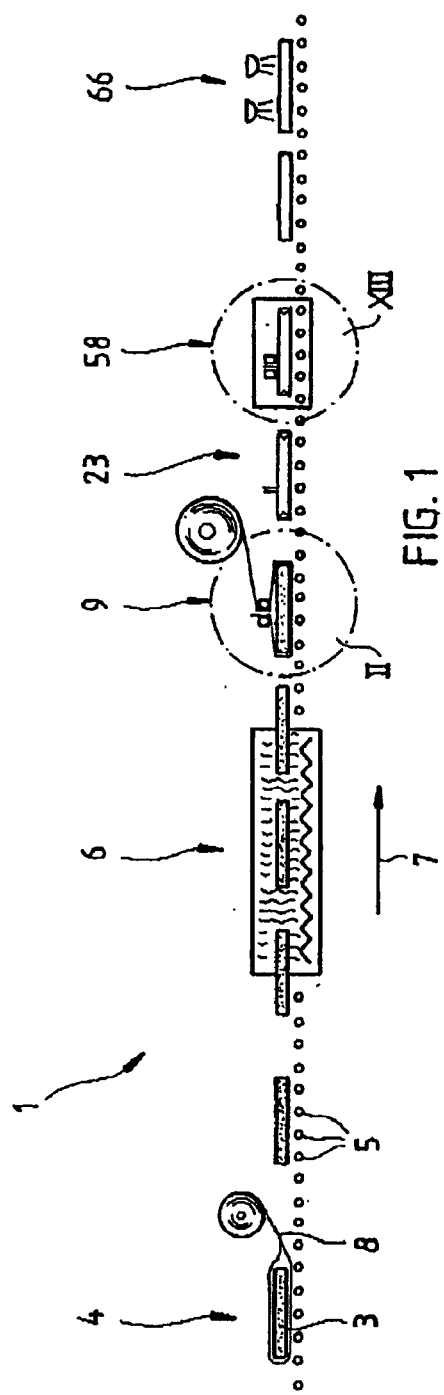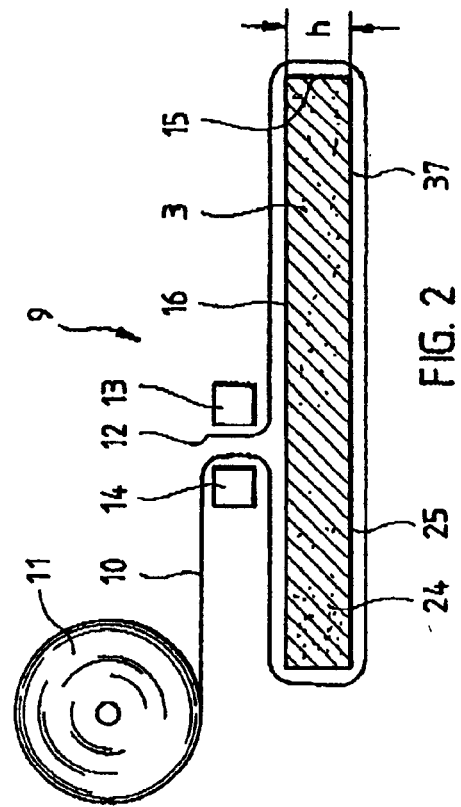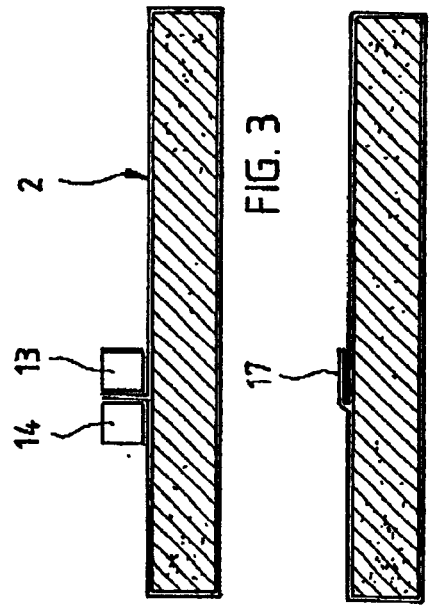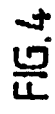

FOIL-ENVELOPED EVACUATED THERMAL INSULATION ELEMENTS

FIELD OF THE INVENTION

The invention relates to a flat-sided, generally prismatic, in particular parallelepipedal and/or panel-formed thermal insulation element which is enveloped in a gas-tight foil and evacuated, as well as a process for its manufacture.

DESCRIPTION OF THE RELATED ART

High-quality thermal insulation is required in an extremely wide range of areas of application. As well as the transport of refrigerated medical samples, organs etc. in containers which are, or can be, specially manufactured for this purpose, use in the thermal insulation of buildings is, in particular, of great importance, since the primary energy requirement can be significantly reduced through good thermal insulation, which represents an important measure for compensating continually increasing heating oil prices. A limiting condition in all these applications, as well as others, is that the thermal insulation elements which can be used for this purpose should have as small a volume as possible, in view of a wide range of considerations, especially aesthetic and practical ones. Although the use of styrofoam panels, for example, may reduce heat loss through the exterior walls of buildings, they do not do so to the desired extent, since the usual panel thickness of 5 cm, for example, is not sufficient for this purpose.

In the case of thermally insulated containers in which objects have to be kept cool for several days during transport, the use of vacuum insulation panels has therefore already been suggested. Such panels consist of a porous core which is enveloped in a gas-tight foil and then evacuated to a high vacuum. By sucking the air out of the pores, a high proportion of the potential heat-transmission medium is removed, and a loss of heat can only take place through the conducting of heat within the core framework.

Besides the choice of a core material with the best possible insulating properties, an important factor in the creation and long-term maintenance of the lowest possible heat transfer coefficient is also a wrapping which is as far as possible one hundred per cent gas-tight, so that a vacuum can be maintained within such an insulation panel for as long a period as possible—over 50 years or more where used in the building sector, for example. It should thereby be borne in mind that such form wrappings usually consist of a plastic substrate which features a sealable coating on one side and a gas-tight metallic coating on the other side. Whereas the foil substrate is elastic and therefore more or less stretchable, the metallic coating, which is usually only a few nanometres thick, cannot withstand pronounced stretching or other deformation and in such cases develops microscopic cracks which cannot be discerned with the naked eye but which significantly reduce the life of the internal vacuum and thus prematurely reduce the thermal insulation properties to levels which are much too low.

During the course of the manufacturing process for such vacuum insulation panels, a pocket is manufactured from two foil sections of the same size and shape with their sealable inner surfaces laid together by means of a U-formed seal running around the margins along three of the four outer edges, the panel-formed core then being slid into this pocket. This forces apart the sections of foil which initially lie together, which, especially in the sealed corner areas, leads to an increased stress on the foil, which is forced to a pronounced deformation at these points. The still-open side of the pocket is then sealed within an evacuated vessel.

The vacuum insulation panel formed in such a way then displays a central area defined by the thickness of the core and a marginal area formed by the welded flanges of the two contacting foils which lie flat against one another and extend radially outwards. These flanges extending radially outwards cause considerable problems when several such insulation panels are joined end to end because, due to the double thickness of the foil at these points, they are very stiff and therefore have to be folded over as a whole. However, this folding can only be carried out with a great deal of stress on the foils, and the corners actually have to be folded several times in order to fold the area of excess foil inwards. This folding therefore almost always leads to damage to the metallic coating and thus to the effect described above of a pronounced decrease in the service life of high heat-insulating capacity.

The disadvantages of the described state of the art result in the problem which initiated the invention, namely to design thermal insulation elements of this generic category in such a way that they can be placed next to one another without a gap, preferably with butt-joined end faces, so that a large area on buildings, for example, can be covered with such thermal insulation elements, and at the same time it should be ensured during the manufacturing process that the enveloping foil is, as far as possible, not subjected to any tensile load, so that the metallic diffusion barrier coating, which is only a few nanometres thick, cannot tear.

BRIEF SUMMARY OF THE INVENTION

Within the scope of a manufacturing process for thermal insulation elements of this kind, the above problem is solved by means of the steps claimed in claim 1.

According to this, the invention avoids the method of forming a foil pocket into which one end surface and the entire face surface was previously slid. Instead, a core with the desired form of the thermal insulation element is first manufactured, and this is then enveloped successively in a single sheet of foil, which is initially flat.

The core is hereby first enclosed, around its outer surface, with the foil, and the foil is then welded together into an approximately tube-like form in contact with the outer surface of the core which still displays two openings in the area of the end faces of the thermal insulation element. Before further sealing of these end faces, the projecting areas of foil are first folded against the relevant end faces of the core by means of appropriate folds so that they are supported over their full surface, whereby, as a result of the flat faces of the core and its sharp edges, ideally, no bulging of the foil occurs; rather, this is folded along edges and is therefore nowhere subjected to a tensile stress which would endanger the function of the metallic diffusion barrier coating, either during this folding process or during subsequent evacuation. Since the foil substrate itself is only a few micrometers thick, the deformations on the folded edges are so slight that the metallic coating can readily perform this.

After the end faces have been sealed, there remains a welding flange projecting approximately perpendicular to the surface of the core, but which extends in a straight line and which joins with the adjoining area of foil via an approximately right-angled corner. This means that this welding flange can then be folded against the relevant end faces of the core largely without stress and thus without the risk of damaging the metallic coating.

Finally, there is no difficulty in evacuating the element which is largely sealed in this way via a temporarily stillunsealed section of a welded seam and then sealing this remaining weld section under vacuum. Because all the welding flanges are folded without stress against the surface of the core, where they can then be fixed into position, adhesively for example, the form of the finished thermal insulation element is largely defined by the form of the prefabricated core. No projecting welding flanges remain in the area of the end face of a panel-formed thermal insulation element, so that there is no difficulty in butt-joining such thermal insulation elements together, which means that no heat bridges remain in the area between two thermal insulation elements placed next to each other.

It has proved favorable for the core to be pressed out of a powder, e.g. a pyrogenic silicic acid, or to consist of an open-pored plastic foam, for example polystyrene or polyurethane.

The invention can be further developed to the effect that the core of the thermal insulation element is wrapped in a gas-permeable filter paper or felt which retains loose particles of the core during evacuation. Since it can never be guaranteed, either with pressed or foamed cores, that individual particles or flakes will not become detached from the mass and be sucked out during the evacuation phase, a precautionary measure for keeping the welded seams clean is necessary, and in this case wrapping the core with a paper or fiber felt which holds onto such detached particles as in a filter has proved practical.

If the core and/or the foil is dried at a temperature of 100° C. to 200° C. before sealing, this ensures that no moisture remains in the subsequently evacuated core which would increase the gas pressure and thus have a negative effect on the insulating function. The result is a product with a very long service life. If the core consists of silicic acid powder, 1–3% moisture which diffuses through the envelope can be absorbed over the course of time without affecting the insulating function.

It has proved practical to cover the core with a thin panel of cardboard for example, or a pressure-resistant, open-pored, moisture-absorbent panel, e.g. a wood fiber panel dried at a temperature above 100° C., before the core is wrapped in the gas-tight foil. Such a covering forms a protection for the core while it is being handled during the invented manufacturing process, and it also guarantees a smooth outer surface of the core without projections which could pierce through the enveloping foil or at least damage its metallic coating. In addition, a moisture-absorbent panel can add to the buffering capacity of a powder core in terms of water vapor and thus extend the service life of the vacuum panel.

The invention also offers the possibility of providing the core with an edge protection of a comparatively hard, especially organic material, e.g. cardboard, before the core is enveloped in the gas-tight foil.

The invention recommends that, when the foil projecting at the end faces is folded together, the area of foil adjacent to the shorter face edges are first folded inwards. This avoids the creation of lateral projections beyond the end face in question, so that only a single fold is required in order to fold a welding flange completely against the surface of the invented thermal insulation element, which allows the stress on the foil caused by the manufacturing process to be further reduced.

If the areas of foil on the end faces which have been folded together and sealed are folded against the surface of the core, the invented thermal insulation elements are bounded by flat surfaces on all sides and can thus be pushed up against the adjoining end faces of adjacent thermal insulation elements to from a butt join.

Preferably, the welded seams folded against the surface of the core are fixed adhesively to the underlying layer of foil.

The thermal insulation element, which is completely enveloped except for a single opening, is then evacuated to a partial vacuum below 100 hPa, preferably below 10 hPa, especially below 1 hPa. This high vacuum not only improves the thermal insulation capacity of the invented thermal insulation element, it also increases its mechanical stability, since the core is permanently subjected to compression on all sides. However, at the same time this high vacuum represents a challenge to the sealing capacity of the enveloping foil which can only be fulfilled through the invented manufacturing process, which does not subject the foil to stress. A flat-sided, generally prismatic, in particular parallelepipedal and/or panel-formed thermal insulation element, enveloped in a gas-tight foil and evacuated, manufactured according to the invented process, is distinguished from known thermal insulation elements in that a stable core, pre-formed from a porous, especially open-pored material, is completely enveloped by a single cut sheet of a gas-tight foil, whereby two faces remain free of folds and/or welds.

In comparison with the principle known from the prior art based on two cut sheets which are welded together to form a pocket, the use of a single cut sheet has the advantage that that it allows a much better adaptation to different core forms, and in addition the subsequent enveloping of the core by the single cut sheet of foil allows the core to be used for support when folding and allows the foil to be pulled tight, so that only minimal wrinkling is to be feared when the core shrinks as a result of evacuation. The support on all sides provided by the core allows the formation of largely flat face and end surfaces which are ideally suited to the placing together of thermal insulation elements of the same type in order to insulate large areas.

All edges of the core should preferably be sharp-edged, with edge radii of less than 1 to 2 mm. The invention also proposes that in a particular embodiment all outer surfaces of the core, especially faces, are exclusively formed with outer edges, i.e. edges with a convex curvature.

A further optimization can be achieved in that the core is formed in such a way that the sum of the interfacial angles of two corners adjoining the same end face is 540°, in particular that the sum of the interfacial angles on a corner is equal to 270°.

Congruent sides on opposite areas of the core allow several thermal insulation elements to be placed together without joints.

In practice, panel-formed cores are of great importance, whereby the distance between the faces of the panels is equal. This means that the welding flanges on the ends run along an intermediate plane between these two faces, resulting in symmetrical conditions in the area between two corners lying symmetrically to this intermediate plane, which favours uniform folding.

It lies within the scope of the invention that the faces of the panel are rectangular.

The melting point of the core should lie above the melting point of the sealable part of the foil.

Very advantageously, the foil is in the form of a compound foil with a lower-melting-point coating on the inner side. This prevents damage to the actual foil substrate during the welding process. The lower-melting-point coating is tuned into a more or less liquid state by heating and the flowing together of the melting coatings which are laid against each other reduces the surface tension on the one hand and also leads to a complete sealing of the contents of the insulating element which is to be evacuated which, as a result of its great width, makes any diffusion of gas practically impossible.

According to the invention, the foil compound features gas-tight metallic coatings. This can, for example, be an aluminum coating with a thickness of at least a few nanometres. This allows a very thin foil substrate to be used, which means that it can be folded without any deformation stress.

It is also proposed that the foil which is stretched tightly around the core is sealed along one outer surface of the core, especially a face.

The high-quality thermal insulation element in accordance with the invention is distinguished in that the areas of the cut section of the gas-tight foil projecting beyond the end faces of the core are folded together without stress, covering and in full-surface contact with the end surfaces of the pre-formed core. A possible means of folding in such a stress-free manner is created in the invention in that the projecting areas of foil on the end faces are folded over prior to sealing, and thus individually, whereby the stress is considerably less than when folded over together in a sealed condition. The subsequent folding of the welding flange flat against the adjacent area of foil can also thereby be regarded as uncritical, since on the one hand the fold line used for this purpose has already been created during the formation of the welding flange prior to the welding process and, on the other hand, one area of foil is simply stretched straight, whereas the other area of foil is at most compressed. As the bending edge in question already exists, the section of foil which is to be stretched also need not be subjected to any expansion, in contrast to the state of the art where extremely unfavorable force circumstances prevail as a result of the complete new formation of a kink following sealing.

The welded seams should run approximately parallel to one another in the area of the end faces, especially approximately parallel to the outer surface, especially the face, containing the weld on the outer surface, especially the face.

As a result of the folding technique specified in the invention, five fold lines converge in the area of a corner of the pre-formed core. Of these, two fold lines each correspond to an edge of the core in the area of this corner, two further fold lines follow the third edge in this corner area in the final state, and the fifth fold line divides two preferably congruent angular areas resulting from the folding-away of the excess area of foil at the corner in question.

The invented folding technique is also characterized in that one of the fold lines encloses an angle of between 30° and 60°, preferably of around 45°, with at least one, preferably two adjacent fold line(s). These are the last of the fold lines described above, which separate the two preferably identical angles. This angle defines part, preferably half, of the area of foil which is to be folded away at the corner in question and can therefore vary within greater or lesser limits depending on the geometry of the corner in question. Since, in the core in accordance with the invention, although two adjacent surfaces need not necessarily be aligned at right angles, they should not meet at an excessively acute angle, since the risk of damage would be especially high at such exposed points, the angle of the area of foil which is to be folded away varies within a more or less narrow tolerance range, whereby an overlapping angle of 45° should be used on a corner with core edges which meet at complete right-angles.

If the above stipulations for the foil overlap width B are observed, two fold lines starting from two adjacent corners lying on both sides of the welding flange meet below an end face welding flange outside of the relevant face edge.

A total of five fold lines also converge at the meeting point outside of the relevant face edge. Two of these fold lines border the fold triangle described above, while fold lines, preferably symmetrical to one another, border an overlapping area folded over part of this fold triangle, and the last of these fold lines runs radially outwards through the adjoining welding flange and forms either its outer limiting edge or borders an end-side overlapping area of a welding flange caused by the folding-away.

If the fold lines on the end faces run in such a way that foil sections always lie with two inner surfaces or two outer surfaces lying against one another, a weld can be positioned without any problem on any desired path, since all sealable surfaces in this area are always covered by a surface which is also sealable and thus allow the lower-melting-point coatings to flow together.

Further advantages arise from the fact that the areas of foil adjacent to the shorter face edges are first folded inwards. This makes it possible to fold the projections in the area of the adjacent surfaces which are to be folded away against the relevant end surface, so that the welding flange running parallel to the longer face edge ends at this shorter face edge and can therefore be folded against the relevant end surface in a single working operation.

In order to seal the foil-enveloped thermal insulation element in an airtight manner at its end faces, the areas of foil which are folded together are sealed to the end faces of the core. In contrast to the state of the art, according to the invention the sealing of the ends is not carried out until the single-layer foil has been folded against the core as far as possible in order to keep the subsequent folding stress as low as possible. In an embodiment in which the panel faces of a flat thermal insulation panel are used as end faces in terms of the invented manufacturing process, the butt joins on the narrow sides of such a thermal insulation panel can be made completely free of folds, except for a single remaining face weld, which makes it even easier to join together identically-formed insulation panels without any heat bridges in the intervening areas.

By folding the areas of foil which are folded together and sealed at the end faces against the relevant end face, the form of the thermal insulation element which is dictated by the core is approximated as closely as possible, so that narrowly-defined geometrical tolerance ranges can also be fulfilled with the thermal insulation elements in accordance with the invention.

The invention can be taken further in that the welded seams which are folded against the surface of the core are fixed adhesively to the underlying layer of foil.

An advantageous form of the invention involves forming the welded seam on the panel face of several sections which intersect and/or overlap. As part of this inventive concept it is possible initially only to seal the panel-face welding flange in the area of the two end faces of the core which is to be enveloped, possibly to fold it against the face of the core and possible fix it there adhesively so that the end face folding and sealing can be carried out properly. However, an opening remains approximately in the middle of the panel-face welded seam which can be used to evacuate the volume of gas which is still contained over a wide area. The remaining opening can then be completely welded closed within the vacuum container, whereby intersections and/or overlaps with the welded seams which were made initially guarantee that the interior of the evacuated thermal insulation element is hermetically sealed.

The partial vacuum in the evacuated thermal insulation element should lie below 100 hPa, preferably below 10 hPa, especially below 1 hPa.

In order to optimize the invented thermal insulation element, its surface can be profiled, e.g. corrugated.

Finally, the invention teaches that at least one continuation of the foil envelope is provided which can be welded together with a corresponding continuation of an adjacent thermal insulation element.

BRIEF DESCRIPTION OF THE DRAWINGS

Further characteristics, details, advantages and effects of the invention arise from the following description of preferred embodiments of the invention and with reference to the drawing, whereby FIG. 1 shows a schematic representation of a plant for the manufacture of thermal insulation elements in accordance with the invention;

FIG. 2 shows detail II from FIG. 1;

FIG. 3 shows the welding device from FIG. 2 during the welding process;

FIG. 4 shows the thermal insulation element after the welded seam created as shown in FIG. 3 has been folded over;

DETAILED DESCRIPTION OF THE INVENTION

Figure 14:
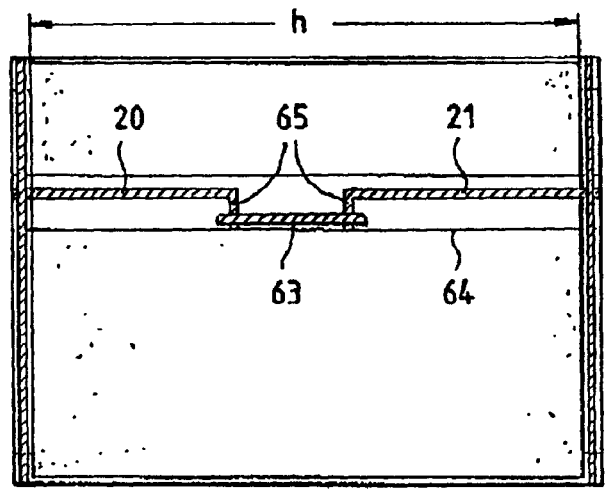
FIG. 14 shows a plan view of the finished thermal insulation element.

FIG. 1 shows a schematic view of a production line for the manufacture of thermal insulation elements 2 of the panel-formed shape shown in plan view in FIG. 14 for example, in accordance with the invented process.

Not shown is a forming process in which a core 3 is pressed from a powder, e.g. pyrogenic silicic acid, or foamed from a plastic, for example polystyrene or polyurethane. This blank core can already have the desired form of the thermal insulation element 2 which is to be manufactured or can be further processed for this purpose, e.g. by sawing or cutting. The blank cores should correspond as exactly as possible to the desired form of the final thermal insulation element 2, although a shrinkage during the evacuation phase on the order of around 5% can be compensated by means of corresponding overdimensioning.

The blank cores 3 are taken from an intermediate store and first enveloped in a felt in a first processing station 4. This has the function of holding back any particles detached from the core mass during the later evacuation phase, thus keeping the seams clean.

The blank core 3 is then transported 7 by a conveyor system to a drying station 6. Here, the cores 3 which are enveloped in felt are heated to a temperature of between 100° C. and 200° C. in order to completely drive out any residual moisture which they still contain. The felt-enveloped cores 3 are then transported 7 to an enveloping station 9, where the dried cores 3 together with their felt envelope 8 are enveloped in a plastic foil. The plastic foil 10 consists of a plastic substrate which features a sealable coating of a lower-melting-point plastic and, in addition, a preferably metallic diffusion barrier coating which is embedded in the plastic and/or covered with one or more protective coatings, preferably of plastic. The foil 10 is wound onto a roll 11, and its width corresponds, in this case where a parallelipipedal core 3 is being enveloped, to the sum of its width b measured transverse to the foil web 10 plus its height h measured perpendicular to the conveyor 7 plus twice the width of a welding flange s required for sealing. On the other hand, this welding flange width s should be equal to or less than half the height h of the core 3.

Figure 13:
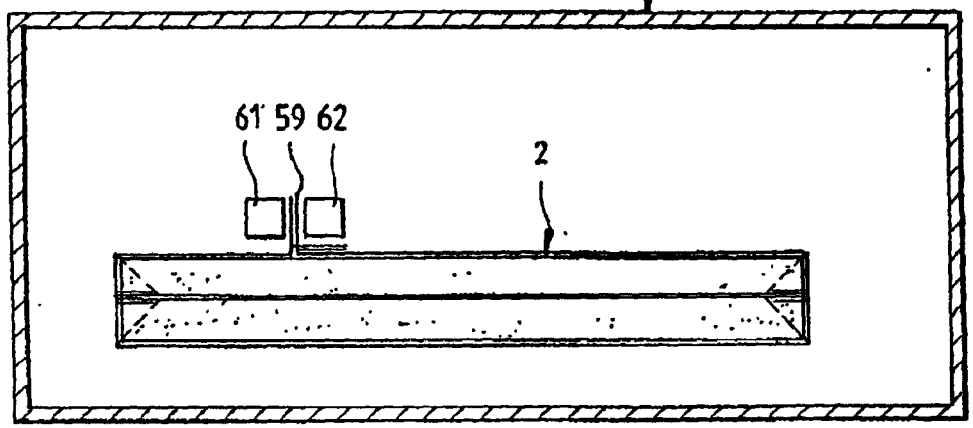
FIG. 13 shows detail XII from FIG. 1.

The foremost edge 12 of this very long foil web 10 is, for example, fixed to a welding die 13 positioned above the conveyor belt 5. The other welding die 14 and the foil roll 11 are at this point positioned beneath the conveyor 5, so that the front edge 15 of the core 3 which is moved onwards carries the foil 10 with it as far as the position shown in FIG. 2. The welding die 14 then swings upwards through a gap in the conveyor system 5 which, for example, be in the form of a roller conveyor, whereby, at the same time, a delayed foil draw-off 10 can be achieved through braking of the foil roll 11, so that the foil always remains tightly stretched. As it swings up, the welding die 14 approaches the fixed welding die 13, and finally these two elements are pressed together, as shown in FIG. 13, and, under thermal action, weld together the welding coatings of the foil 10 which lie against one another. The foil 10 surrounding the core 3 is cut off from the remaining web 10 outside of the welded seam.

Figure 12:
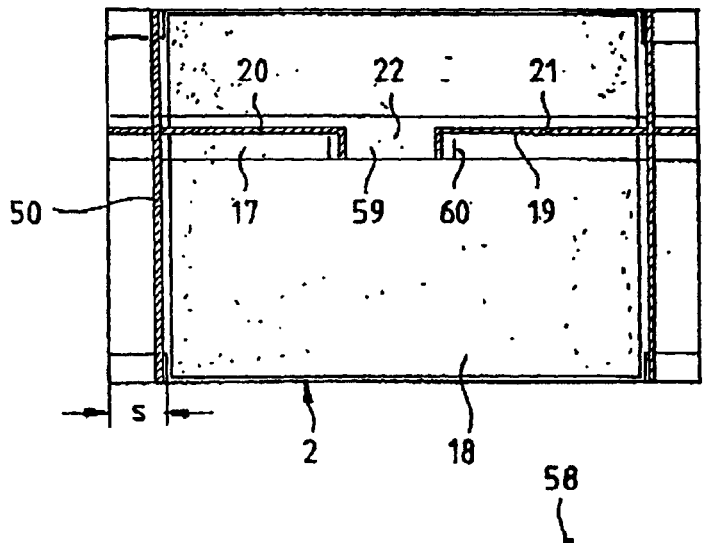
FIG. 12 shows the whole thermal insulation element in the state of folding shown in FIG. 7 or FIG. 9 after the sealing of the end face has been carried out.

Next, the welding flange 17 which is initially still projecting at right angles to the upper face of the panel 16 is folded against the upper side 18 of the thermal insulation element 2, as shown in FIG. 4, and it can be fixed in this position by means of a hot adhesive, for example. In this connection it should be noted that the welding dies 13, 14 can also be designed in such a way that no continuous welded seam is produced, but an interrupted welded seam 19 as shown in FIG. 12 on the folded welding flange 17. This means that an opening 22 remains between the two welded sections 20, 21, through which the air contained in the core 3 can be sucked out at a later stage.

The conveyor system then leads to a further processing station 23 in which the end faces 24 of the core 3, the sides of which are already enveloped in the foil 10, are covered and sealed by the edges of the foil which still project laterally at the exit of the enveloping station 9.

Figure 6:
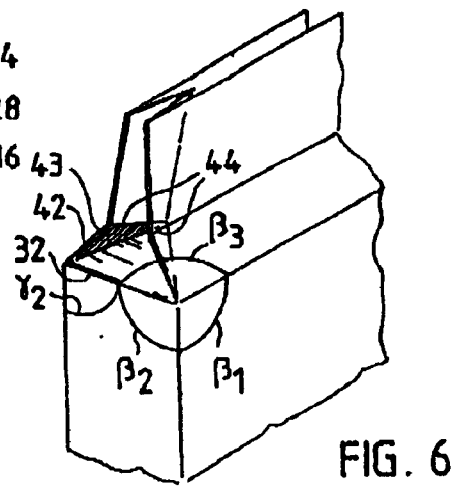
FIG. 6 shows a second phase of the folding shown in FIG. 5.
Figure 7:
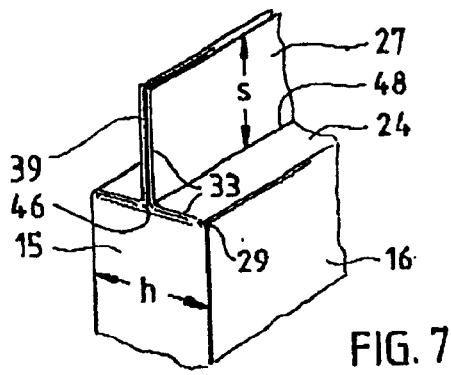
FIG. 7 shows a final third phase of the folding shown in FIGS. 5 and 6, producing an aligned, sealable flange.
Figure 8:
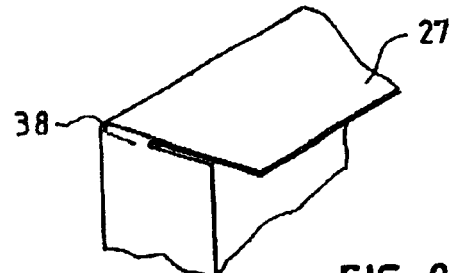
FIG. 8 shows the folding over of the welding flange from FIG. 7 following the welding process.

According to a first embodiment of the invention, this lateral seal can be effected by means of the process steps illustrated in FIGS. 5 to 8. In a first phase (FIGS. 5 to 7), the projecting edge area 26 is folded together in such a way that, on the one hand, it completely covers the relevant end face 24 and on the other hand, is folded to form a flat welding flange 27 projecting away from this approximately at right angles. This welding flange 27 is then sealed by means of a sealing device, which is not shown, and finally the welding flange 27 is folded against the end face 24 as shown in FIG. 8.

Figure 5:
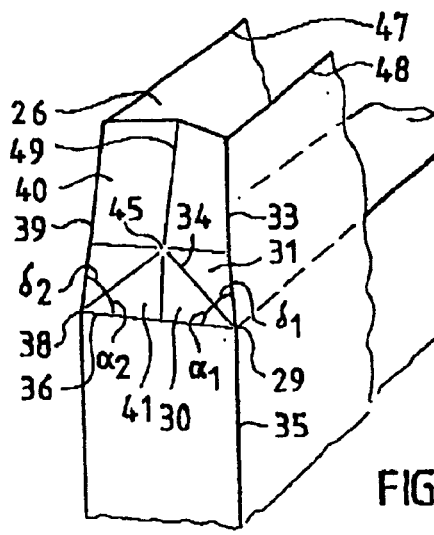
FIG. 5 shows the manufacture of a stress-free end face fold in a first embodiment of the invention in a first folding phase.

The inventors have found out that, in order to form an optimal covering of the end face 24, i.e. a bulge-free, plane parallel contact of the foil 10, and to form a welding flange 27 which is also highly suitable for the welding procedure, i.e. a flat flange with a constant width, a particular folding strategy offers particular advantages. This is shown in FIGS. 5 to 7.

It can be seen from FIG. 8 that a welding flange 27 is optimal if its width s is less than half the height h of the panel-formed thermal insulation element 2, since in this case it can be completely folded against the relevant end face 24 and does not project beyond its edge 28. For the same reason, it is important that the end edges 39 of the welding flange 27 do not project beyond the adjoining end face 15 of the insulating panel 2.

In solving the subsidiary problem defined in this way, the inventors proceeded from the knowledge that a total of three sides 15, 16, 24 meet in the area of the corner 29 of a, particularly, parallelepipedal core 3. Since, in a parallelepiped, each corner represents a right angle, the sum of all angles $\beta_1$, $\beta_2$, $\beta_3$ meeting at such a corner is defined as:

$$\beta_1+\beta_2+\beta_3=3\times 90°=270°.$$

Since, on the other hand, the foil surrounds the point lying on the corner 29 completely and thus around a circle of 360°, an excess area of 90° remains which, according to the invention, is folded away so that the foil 10 does not need to be processed so as to depart from its rectangular shape, e.g. by cutting it to shape. This principle of folding away has the advantage that it is ensured that the foil cannot develop any opening at this point through which air could later penetrate into the evacuated thermal insulation element 2.

The folding-away is effected in that the excess angle, which amounts to 90° in the case of a parallelepiped, is taken up by a multi-layered area of the foil 10 on one of the three sides, in this case the end face 24. In one area, therefore, the end face 24 is not covered by a single layer of foil 10, but by a triple layer of foil. The two additional foil layers 30, 31 can be seen in FIG. 5 from the adjacent fold lines 32–34. A central fold line 35 running diagonally to all the other edges 28, 35, 26 which meet at the corner 28 thereby divides the surplus area of foil 30, 31 which has to be folded away into two equal angles $\alpha_1$ and $\delta_1$; in this case:

$$\alpha_1=\delta_1=45°.$$

As can be seen from FIGS. 5 to 8, the folding is completely symmetrical to a central plane running between the two faces of the panel and parallel to these, so that symmetrically identical folds occur on the corner 38 of the core 3 at the opposite end of a core edge 36 passing through this central plane at right angles, whereby the fold line 32 in particular intersects with the fold line coming from the first corner 29 which was considered. Since, in the condition shown in FIG. 7, the fold line 33 runs parallel to the fold line 32 and the core edge 36, this must form a right angle with the core edge 28, which in turn runs at right angles to the core edge 35. The fold line 33 thus runs—in relation to the still completely unfolded edge projection 26—coaxially to the core edge 35 and thus parallel to the opposite fold line 39. Because of the right angle $\beta_2$ and the edge projection 26 which, due to the parallelepipedal form is the same size on all sides, this produces a rectangular area of foil 40 between the two outer surfaces which form the welding flange 27, which has to be folded between the two covering surfaces of the welding flange as smoothly as possible.

For this purpose, a triangular area 42 defined by the fold line 32, the diagonal fold line 34 and the fold line 41 which is symmetrical to this in relation to the central pane of the core is folded against the end face 24 of the core 3, as shown in FIG. 6. This is covered on one side by the area of foil 31, also triangular, and by the area of foil 43 which is symmetrical to this, in such a way that their initially upper border 44 finally comes together. Since the triangular areas 31, 43 cover the triangular areas 30, 41 through this overlapping, these triangles must be congruent. Since the angle at the apex 45 of the triangular area 42 is, in this case, 90° due to the sum of angles in the triangle 42, the angles of the adjacent triangles 31, 41 starting from this point must each be 45°. For this reason, the fold lines 44—in relation to the original unfolded condition of the edge area 26—run horizontally or parallel to the end face 24. Accordingly, the triangles 30, 31, 41, 43 are all equilateral triangles, and for this reason the corner points of the horizontal fold lines 44 intersecting with the initially vertical fold lines 33, 39 meet the center point 46 of the fold line 32 in the final folding condition shown in FIG. 7. The upper part of the rectangular foil area 40 above these fold lines 44 therefore folds readily, in the manner of a concertina, between the cover surfaces of the welding flange 27, as shown in FIGS. 6 and 7. Sealable inner areas of foil or metallic-coated outer areas of foil always thereby lie against one another, so that complete sealing is possible without affecting the metallic coating.

As one can see, on further consideration, different changes to the geometry of the core 3 result in different effects on the form of the welding flange 27. However, it has been found that these effects can be disregarded, at least in terms of the quality of the folding, if the sum of the lateral angles at adjacent corners 29, 38 of the core 3 always remains equal to 540°:

$$\beta_1+\beta_2+\beta_3+\gamma_1+\gamma_2+\gamma_3=540°$$

This means that the triangle 42 which is preferably to be folded inwards still has a right-angled apex 45, so that the fold lines 44 starting from here run in a common alignment; accordingly, in the condition shown in FIG. 7 the fold line 49 stands at right angles to the end face 24, and the upper edges 47, 48 of the edge area 26 which are generally at right angles to these run parallel to the end face 24, which results in a constant welding flange width s. An inclination of the fold line 49 in relation to the upper edges 47, 48 of the edge area 26 which would affect this result can be avoided by means of the even stricter geometrical condition $$\beta_1+\beta_2+\beta_3=\gamma_1+\gamma_2+\gamma_3=270°$$

for the core 3.

As stated above, in the folding shown in FIGS. 5 to 8, the surplus foil area 40 is folded at the bottom over the end face 24 and with its upper area between the end areas of the welding flange 27, so that after the welded seam 50 is made, the welding flange 27 only needs to be folded around its lower edge 48.

Figure 9:
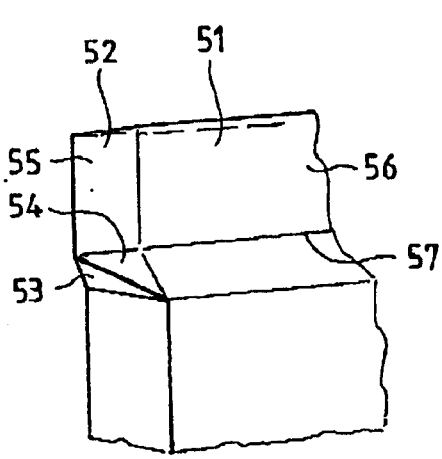
FIG. 9 shows another possible means, according to the invention, of stress-free end face folding in an intermediate phase leading to the creation of an aligned, sealable flange.
Figure 10:
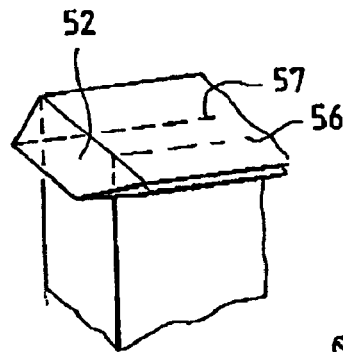
FIG. 10 shows a first folding-over of the welding flange from FIG. 9 following the welding process.
Figure 11:
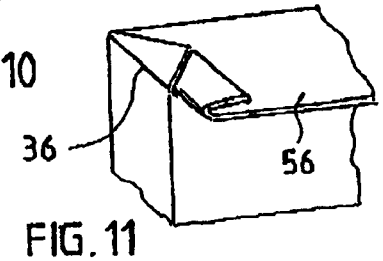
FIG. 11 shows a further folding of part of the welding flange against the end face of the thermal insulation element.

In another folding technique shown in FIGS. 9 to 11, the areas of foil 51 projecting on the longitudinal edges of the end face 24 are first folded towards one another onto the end face 24, forming a welding flange 56, and the surplus area of foil 52 is folded out to project over the adjacent end face 15. The resulting triangle 53 lies in alignment with the end face 24 and, like the triangle 42 in the first described folding technique, is overlapped by the fold triangles 31, 43 described above, and in this case by the additional fold triangles 54. These upper foil triangles 54 are then bordered by a vertical, double-layered foil area 55, which represents an extension of the welding flange 56. Here too, the foil areas 10 only have their sealable inner surfaces in flat contact and can therefore be sealed easily. Once this has been done, the welding flange 56 is folded over its base edge 57, as shown in FIG. 10, and finally the area 52 formed by the lateral projections 53–55 is folded over the relevant face edge 36 of the core 3 in the direction of the end face 24, as shown in FIG. 11. Here too, it can be seen that the above condition for the edge projection B is not complied with and requires a further cutting operation.

Although this last folding method is possible in principle, it is less recommended by the inventors because in this case the welding flange 56 has to be folded double, which could tend to subject the metallic diffusion barrier coating to the risk of damage.

Following the process step of sealing the end faces in the processing station 23, the core 3 which is completely enveloped in the foil 10 except for the opening 22 is laid in an evacuatable vessel 58, in such a way that the area 59 of the panel-face welding flange 17 containing the opening 22 is raised approximately perpendicular to the relevant face surface 16 of the panel, as shown in FIG. 13. This can be effected, for example, in that the area 59 of the welding flange 17 which is to be raised is separated by means of short incisions 60 from the adjacent already-sealed sections 20, 21 and then bent upwards forming an additional fold. This area 59 containing the opening 22 is placed between two welding dies 62 which, however, are not moved together yet. Rather, the vessel 58 is then sealed and evacuated to a pressure of between 0.1 and 1 hPa. A period 20–120 seconds, for example, is then waited in order to allow the air initially contained in the core 3 to escape from the opening 22 as a result of the pressure difference in comparison with the vacuum.

As soon as the pressure has equalized and the core 3 is also evacuated, the two welding dies 61, 62 are closed by remote control and the welding process is activated. This creates a further welded seam 63 which runs parallel to the first two welded sections 20, 21, but which is preferably displaced in the direction of the free edge 64 of the panel-face welding flange 17.

Since, during the creation of the original welded sections 20, 21 on the edges of the remaining opening 22, the opening 22 was bounded over virtually the whole width of the welding flange 17 by means of a welded seam 65 running approximately perpendicular to the longitudinal direction of the welding flange 17 and extending up to the edge 62, during the final sealing 63 an intersection with the perpendicular welded seams 65 can easily be achieved, so that an absolutely airtight sealing of the thermal insulation element 2 is guaranteed.

Finally, the flange area 59 containing the original opening is folded against the relevant flat side 16 of the thermal insulation element 2 and fixed there by means of a hot adhesive. The thermal insulation element 2 is then completed and can be subjected to a quality test at a testing station 66.

On the other hand, instead of evacuation via an opening 22 in the panel-face welded seam, evacuation can also be carried out via one of the welded seams on the end faces, in that only the two corner areas are initially sealed and the remaining central areas is only sealed under vacuum.

What is claimed is:

1. A flat sided, substantially prismatic thermal insulation element having a pair of major, opposite, outer faces and surrounding end faces, the insulation element including a preformed, porous core completely enveloped in a single sheet of a gas tight foil and evacuated, the insulation element comprising:

(a) a welded seam joining contiguous layers of the foil and extending across only one major outer face of the insulation element between opposite end faces;

(b) a pair of welded seams joining contiguous layers of the foil forming a weld flange, each of the pair of welded seams extending parallel to said major face and along only said opposite end faces; and (c) a fold in the enveloping sheet at each end of each of said opposite end faces, the fold having fold lines forming a first triangle having a right angled apex and a base along an end edge of an end face and having a total of five fold lines converging at the apex of the first triangle, two of the five fold lines bordering the first triangle, another two of the five fold lines being symmetrically positioned and bordering areas folded over part of the first triangle, and the fifth fold line of the five fold lines extending radially outwardly through an adjoining one of the pair of welded seams.

2. Thermal insulation element in accordance with claim 1, wherein the foil is drawn tightly around the core and the welded seams are folded against the core.

3. Thermal insulation element in accordance with claim 1, wherein the sheet of gas-tight foil is covering and in flat contact with faces of the pre-formed core including the end faces.

4. Thermal insulation element in accordance with claim 3, wherein five fold lines converge in an area of a corner of the pre-formed core.

5. Thermal insulation element in accordance with claim 3, wherein sections of foil near fold lines on the end faces always have two inner surfaces or two outer surfaces lying in contact.

6. Thermal insulation element in accordance with claim 3, and further comprising folded-together areas of foil on the end faces of the core sealed and folded against the end faces and fixed to the underlying layer of foil.

7. Thermal insulation element in accordance with claim 1 wherein the fifth fold line forms an outer end of the weld flange.

8. Thermal insulation element in accordance with claim 1 wherein the fifth fold line is folded within an end, overlapping area of the weld flange.

* * * * *